(12) United States Patent
Kulkarni et al.

(10) Patent No.: US 10,560,966 B2
(45) Date of Patent: Feb. 11, 2020

(54) WIRELESS COMMUNICATIONS DEVICE AND METHOD

(71) Applicant: KABUSHIKI KAISHA TOSHIBA, Tokyo (JP)

(72) Inventors: Parag Gopal Kulkarni, Bristol (GB); Fengming Cao, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/504,584

(22) PCT Filed: Mar. 31, 2015

(86) PCT No.: PCT/GB2015/051011
§ 371 (c)(1),
(2) Date: Feb. 16, 2017

(87) PCT Pub. No.: WO2016/156767
PCT Pub. Date: Oct. 6, 2016

(65) Prior Publication Data
US 2018/0014330 A1 Jan. 11, 2018

(51) Int. Cl.
*H04W 74/08* (2009.01)
*H04W 84/12* (2009.01)

(52) U.S. Cl.
CPC ... *H04W 74/0825* (2013.01); *H04W 74/0808* (2013.01); *H04W 84/12* (2013.01)

(58) Field of Classification Search
CPC ......... H04W 74/0816; H04W 74/0808; H04W 74/0825; H04W 84/12
See application file for complete search history.

(56) References Cited

U.S. PATENT DOCUMENTS

| 6,157,616 A * | 12/2000 | Whitehead | H04L 47/10 370/252 |
| 2006/0046739 A1* | 3/2006 | Blosco | H04W 28/18 455/453 |
| 2008/0008133 A1* | 1/2008 | Zhu | H04W 72/085 370/332 |

(Continued)

FOREIGN PATENT DOCUMENTS

| JP | 2010-98739 A | 4/2010 |
| JP | 2013-5097 A | 1/2013 |

OTHER PUBLICATIONS

International Preliminary Report on Patentability and Written Opinion issued by The International Bureau of WIPO, dated Oct. 12, 2017, for International Patent Application No. PCT/GB2015/051011.

(Continued)

*Primary Examiner* — Will W Lin
(74) *Attorney, Agent, or Firm* — Finnegan, Henderson, Farabow, Garrett & Dunner, L.L.P.

(57) ABSTRACT

Management of receiver sensitivity in a packet based wireless communication system is achieved by controlling a clear channel sensing process which determines if the channel is clear for use, governed by a sensitivity to use of the channel. The sensitivity of the clear channel sensing process is effected by monitoring transmission performance over a plurality of emissions, and making adjustments to the sensitivity based on comparison of that performance with a performance criterion.

13 Claims, 4 Drawing Sheets

(56) References Cited

U.S. PATENT DOCUMENTS

| | | | |
|---|---|---|---|
| 2010/0128705 A1 | 5/2010 | Miyoshi | |
| 2012/0320759 A1* | 12/2012 | Shao | H04W 24/02 370/242 |
| 2013/0203429 A1* | 8/2013 | Kneckt | H04W 72/1263 455/450 |
| 2014/0086081 A1* | 3/2014 | Mack | H04L 5/006 370/252 |
| 2014/0376453 A1* | 12/2014 | Smith | H04W 74/0816 370/328 |
| 2015/0156662 A1* | 6/2015 | Bai | H04W 4/027 370/231 |
| 2015/0296528 A1* | 10/2015 | Coffey | H04L 1/0021 370/338 |
| 2016/0164646 A1* | 6/2016 | Kwon | H04L 43/16 370/252 |
| 2016/0198493 A1* | 7/2016 | Lin | H04W 74/0816 370/336 |
| 2016/0227489 A1* | 8/2016 | Oteri | H04W 74/0808 |
| 2016/0262170 A1* | 9/2016 | Lee | H04W 16/14 |
| 2017/0230986 A1* | 8/2017 | Moon | H04L 5/0078 |
| 2017/0257889 A1* | 9/2017 | Mukherjee | H04W 76/15 |
| 2017/0303136 A1* | 10/2017 | Park | H04W 74/08 |
| 2018/0270038 A1* | 9/2018 | Oteri | H04L 5/0037 |

OTHER PUBLICATIONS

Smith, "Dynamic Sensitivity Control Practical Usage," IEEE 802.11ax Contribution-14/0779r2 (Jun. 2014), slides 1-31.
Coffey, "A Protocol Framework for Dynamic CCA," IEEE 802.11ax, Contribution-14/0872r0 (Jul. 2014), slides 1-16.

\* cited by examiner

WIRELESS COMMUNICATIONS DEVICE AND METHOD

FIELD

The present disclosure is concerned with managing receiver sensitivity to reduce instance of overlapping transmissions in a wireless carrier medium.

BACKGROUND

Density of wireless communications networks is increasing. This includes an increase in the concentration of wireless networking devices in a particular region of interest, and an increase in use made by such devices of the available wireless communication medium, i.e. the radio frequency (RF) spectrum.

Increased density increases the likelihood of collision between two wireless transmissions, unless steps are taken to mitigate this likelihood.

One approach to attempt to reduce the possibility of collision is for a station (STA), before using a channel, to sense the channel to determine if the channel is clear to be used. This is often governed by a clear channel assessment (CCA) threshold, a parameter used to define the sensitivity of a station to incoming transmission from other STAs.

The present disclosure describes embodiments which harness the concept of CCA and provide further examples of management of channel access.

DESCRIPTION OF SPECIFIC EMBODIMENTS

Figure 1:
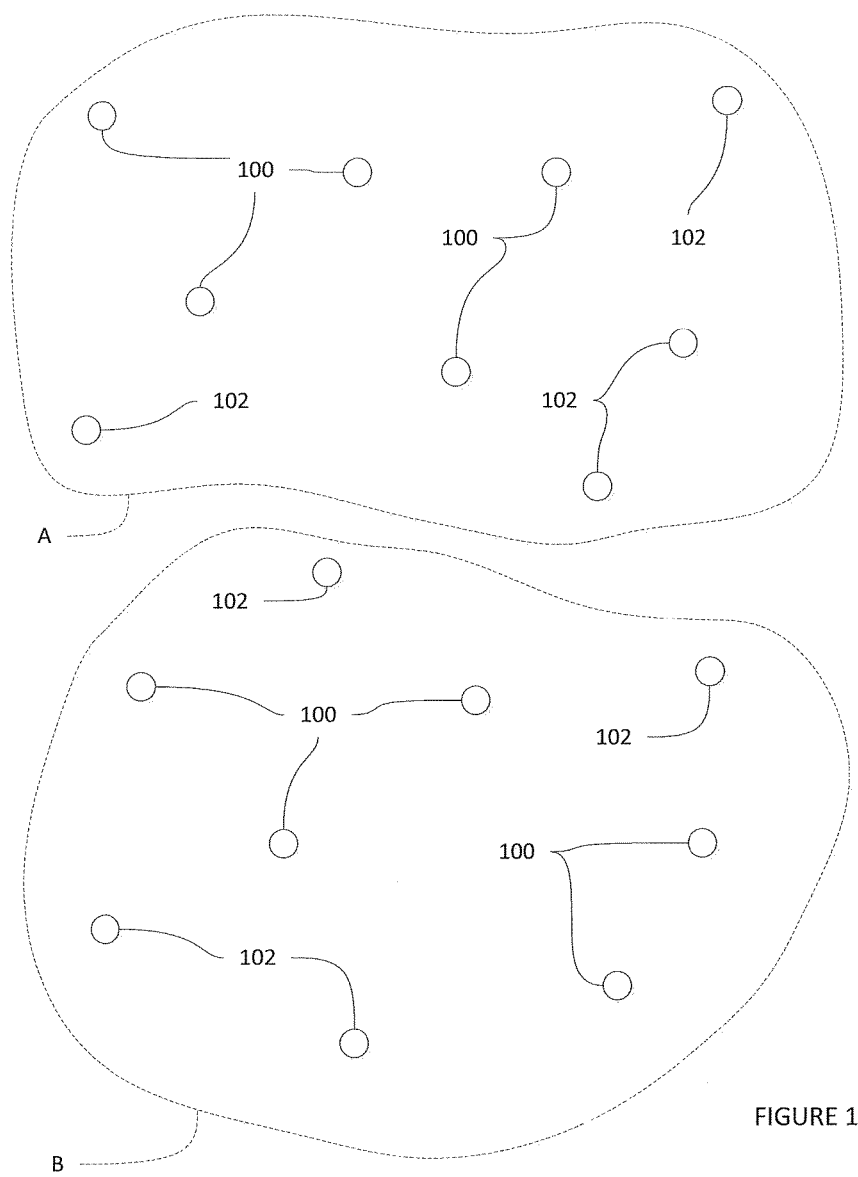
FIG. 1 is a schematic drawing of a deployment of wireless communications devices in a region of interest, including a plurality of devices according to a described embodiment.

In general terms, embodiments describe the management of receiver sensitivity in a packet based wireless communication system. This is achieved by controlling a clear channel sensing process which determines if the channel is clear for use, governed by a sensitivity to use of the channel. The sensitivity of the clear channel sensing process is effected by monitoring transmission performance over a plurality of emissions, and making adjustments to the sensitivity based on comparison of that performance with a performance criterion.

An embodiment described herein provides a wireless communications station operable to emit packet based communication on a wireless communications channel, the station comprising a clear channel sense unit operable to determine if the channel is clear for use, sensitivity of the clear channel sense unit to use of the channel being governed by a clear channel assessment, CCA, parameter; and a CCA parameter control unit, operable to control the CCA parameter; wherein the CCA parameter control unit comprises a transmission performance monitor operable to monitor performance of said station in terms of successful transmission of emissions by said station to intended destinations, and wherein the CCA parameter control unit is operable to control the CCA parameter on the basis of said transmission performance of said station.

An embodiment described herein provides a method of emitting packet based communications on a wireless communications channel, the method comprising determining if the channel is clear for use, subject to a sensitivity by a clear channel assessment, CCA, parameter; monitoring performance of said emitting in terms of successful transmission of emissions to intended destinations; and controlling the CCA parameter on the basis of said transmission performance of said emitting.

An embodiment described herein provides a computer program product for causing a computer to perform a method of emitting packet based communications on a wireless communications channel, the product comprising program code comprising executable instructions which, when executed by a computer, cause the computer to determine if the channel is clear for use, subject to a sensitivity by a clear channel assessment, CCA, parameter; program code comprising executable instructions which, when executed by a computer, cause the computer to monitor performance of said emitting in terms of successful transmission of emissions to intended destinations; and program code comprising executable instructions which, when executed by a computer, cause the computer to control the CCA parameter on the basis of said transmission performance of said emitting.

The specific case of WLAN networks is discussed in this disclosure, though the reader will appreciate that the present disclosure could be adapted to other specified communications technologies.

In certain background examples, the CCA threshold of a STA is fixed, thereby resulting in the physical carrier sensing range of the STA being fixed. In a dense deployment, a number of WLAN networks may be operating in each other's vicinity on the same channel. Transmissions in one network may result in suppression of transmissions in the other.

To illustrate this, two networks are considered, A and B, which are composed of stations which neighbour each other to the extent that transmissions made by certain stations in network A are capable of being detected by certain stations in network B, and vice versa.

In this example, an STA in network A performs carrier sensing, governed by a CCA threshold. The CCA threshold seeks to determine a boundary between the channel being available for use by the STA, and the channel being in use by another STA in the network in question.

However, the CCA threshold may be at a level such that the STA in network A is sensitive to transmissions taking place between STAs in network B in range of the STA of network A. In one case, this carrier sensing by the station in network A causes the station to find the medium busy, due to an STA in neighbouring network B which happens to be transmitting on the same frequency at the same time.

This is undesirable, as there may be many reasons why a transmission in network B may have no impact, in reality, on the availability of the channel for STAs in network A. The CCA threshold, in this case, could be considered oversensitively set, as the operation of the STA in network A is being disrupted by operation of an STA in network B.

Embodiments described herein seek to curtail the CCA threshold for stations in a network, to reduce the possibility of falsely suppressing communications which could legitimately proceed (unnecessary link suppression).

Embodiments described herein provide dynamic variation of the CCA of an STA. This may assist in situations whereby the topology and link conditions are variable.

Embodiments described herein describe a method by which each STA can independently update its sensitivity so as to counter such aforementioned link suppression effects.

A specific embodiment will now be described with reference to FIG. 1. FIG. 1 shows a deployment of wireless communications devices 100, 102. These devices are organised into two networks A and B. These networks are indicated in FIG. 1 by bounding broken lines.

Certain of the devices of network A are physically close enough to devices of network B that an emission by a device in network B may be received by a device of network A.

The embodiment is implemented on one of the devices of network A, indicated by reference number 102, whereas devices 100 as indicated implement a more basic functionality lacking ability to adapt CCA to take account of circumstances. The difference is described here to demonstrate backwards compatibility of the embodiment.

Figure 2:
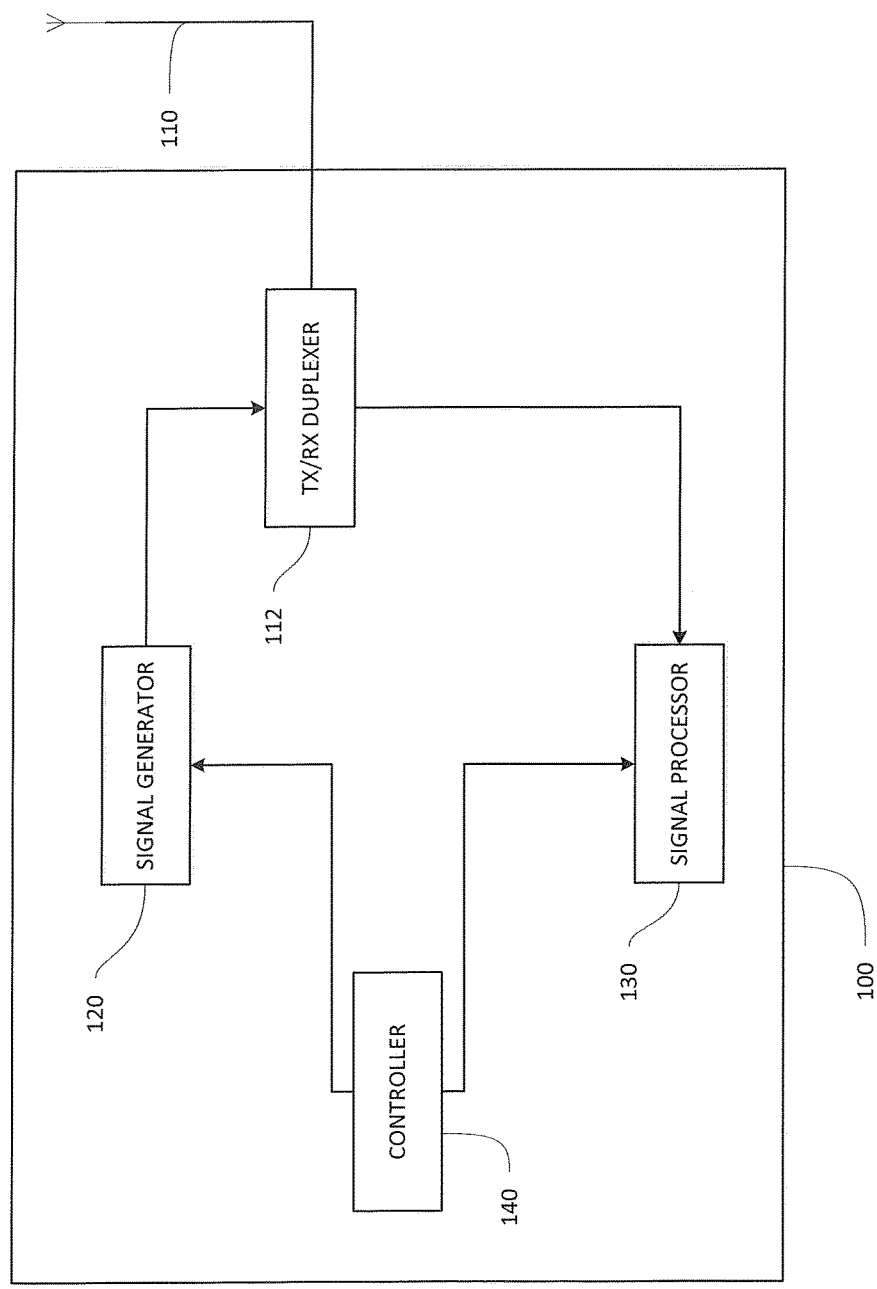
FIG. 2 is a schematic drawing of a wireless communications device, provided to demonstrate compatibility with a device according to an embodiment.

Therefore, device 100 is illustrated schematically in FIG. 2. The device 100 comprises an antenna 110 connected to a TxRx duplexer 112. The duplexer 112 is used to manage the use of the antenna as a means of generating an RF signal, or for detecting RF signals from other devices.

The duplexer 112 is fed by a signal generator 120. The signal generator 120 is operable to drive the emission of signals bearing packets of information. Similarly, a signal processor 130 is operable to process signals received at the antenna 110, and to extract packet based information therefrom.

To do this, the device is under the control of a controller 140. The controller 140 is operable to manage the operation of the device 100, enabling the signal processor 130 to monitor the wireless communication channel for a period, to determine, based on a clear channel assessment protocol whether the channel is available for use, and to implement the transmission of packetized information via an RF emission driven by a signal generated by the signal generator 120.

The reader will appreciate that various functional and structural aspects of the device 100 are not illustrated in FIG. 2, for reasons of clarity. The device 100 will, in most cases, be a computer apparatus, containing information and instruction processing capabilities, and can be a laptop, hand-held device, smartphone, or an application specific device such as a television, sound system, gaming station, media player (such as DVD player). It could also be an article of household equipment such as a laundry appliance or a refrigerator, a medical component such as an on-body sensor, or an industrial component such as a sensor or an actuator. The latter cases are apposite in terms of the development of an "Internet of Things" recognition that, with the increasing ubiquity of wireless communication enabled devices, techniques are increasingly needed to avoid communication difficulties such as collisions.

Figure 3:
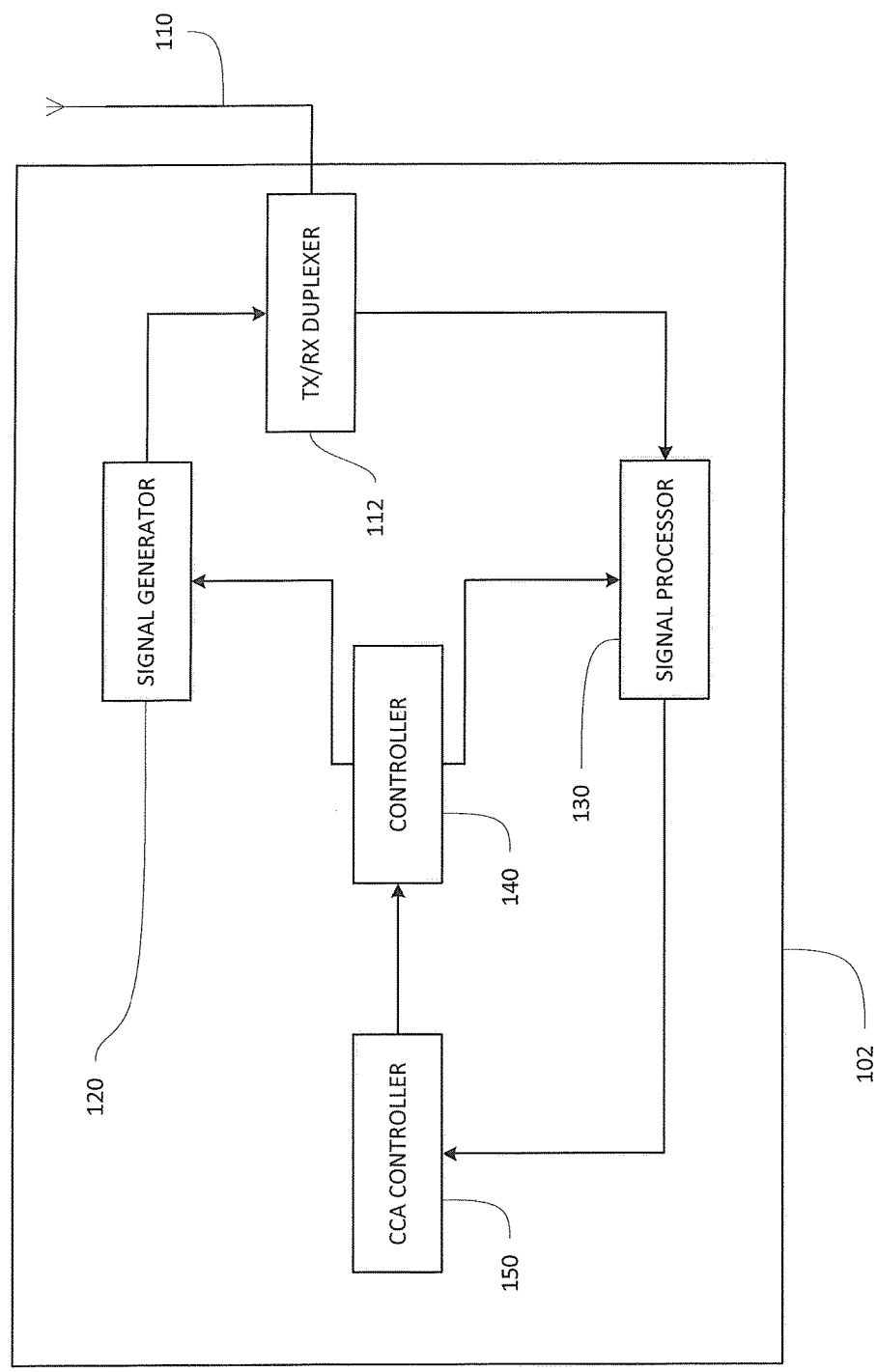
FIG. 3 is a schematic drawing of a wireless communications device in accordance with an embodiment.

FIG. 3 illustrates the device 102 in which the embodiment is implemented. As above, the device can be any wireless communications enabled device.

In this case, all components previously described in relation to device 100 are also implemented here. However, in addition, a CCA threshold controller 150 provides a signal to the controller 140, on the basis of which the controller 140 is able to manage the process of sensing the channel prior to effecting an RF emission. In general terms, the CCA threshold controller 150 is operable to record emissions made by the device 102, for instance through a trigger provided by the controller 140 or by directly monitoring the output of the signal generator 120. Then, the CCA threshold controller 150 seeks the receipt of an acknowledgement (ACK) message at the signal processor 130. The incidence of ACK messages to output messages governs whether the CCA threshold controller 150 signals to the controller 140 that the CCA threshold, by which the controller 140 governs clear channel assessment, should be maintained, increased, or decreased.

The method by which this CCA threshold controller 150, in accordance with the embodiment, performs this process, will now be described with reference to FIG. 4.

The method commences in step S1-2 by setting some initial conditions. First, a value maxRST is set to −85 dBm. maxRST is a quantity which describes the sensitivity of the device, and −85 dBm is a typical value for the maximum sensitivity supported by an interface card in which the embodiment may be implemented in practice. maxRST may be set to any value commensurate with the performance expectations of the device.

The device CCA threshold is set to maxRST as an initial, conservative, value. That is, at the outset of the process, the CCA sensitivity of the device is set to its maximum possible value, so as to ensure that carrier access checks capture all possible sources of collision until the device has settled to an operating state which matches the operating conditions more appropriately.

A counter Count is set to zero. Count is used to count a number N of emissions to be tested in a test cycle.

A stepAdjust value is set to 10 dBm. stepAdjust describes a minimum step adjustment of the CCA threshold to be employed by the device in determining channel availability.

Two further counters successfulTx and collisionCount are also set to initial values of zero. In use, successfulTx stores a count of successful transmissions, and collisionCount stores a count of transmissions lost due to collision. Both of these counts are used in determining if the CCA should be adjusted after completion of a test cycle.

In step S1-4, a packet is transmitted by the device, such as to its associated access point (AP). In step S1-6, a check is made as to whether an ACK has been received corresponding to this transmitted packet.

If the ACK has been received, then successfulTx is incremented by 1, in step S1-8. Otherwise, if no ACK is received in a suitably set time period, then in step S1-10 a determination is made as to the reason for the apparently failed transmission. In the absence of an ACK, the potential cause of loss is estimated using techniques such as using ACK rate feedback from previously successfully received ACK messages or by picking up trends in the state of the channel by using RSSI/SNR as a proxy. If this classification step points to a potential collision related loss, then in step S1-12 collisionCount is incremented by 1.

After completion of step S1-8, step S1-12, or alternatively if in step S1-10 the transmission failure was deemed not to have occurred by reason of collision, then the method proceeds, in step S1-14 by incrementing Count.

In step S1-16, a determination is made as to whether Count is equal to a predetermined value N. N is the number of transmissions over which the method runs and after which determinations are made as to whether the CCA is correctly set. If Count has not yet reached N, then the method returns to step S1-4 for the next transmission.

Otherwise, if Count has reached N, then the method proceeds to determine a response to the outcomes of the most recent N transmissions recorded in the values of collisionCount and successfulTx.

In step S1-18, a determination is made as to whether collisionCount is greater than or equal to N/2. That is, at least half of the most recent N transmissions resulted in collision. If so, then the potential cause of the collision has to be determined. This is achieved by considering, in step S1-20, whether any neighbouring APs are on the same channel as the device's associated AP. If not, then the sensitivity CCA is increased in step S1-22.

It is important to note that sensitivity is expressed in this disclosure as a quantity on a logarithmic scale, with a maximum sensitivity maxRST being a negative value. Thus, considering the sensitivity on a number line, an act of increasing sensitivity is effected by increasing the magnitude of the negative number CCA, which on the number line, moves the value CCA towards the negative, that is, the act is effectively an an algebraic decrease. Similarly, an act of decreasing sensitivity will be effected by decreasing the magnitude of the negative number CCA and that represents a movement of CCA along the number line towards the positive, i.e. an increase. For the benefit of clarity, the disclosure refers to increase and decrease of sensitivity, rather than increase or decrease along the number line.

Sensitivity increase is achieved by the following steps.

In step S1-24, a determination is made as to whether the sensitivity can be increased, that is, whether the value of CCA is currently more than stepAdjust away from the limit maxRST. This determines if increasing the sensitivity CCA by the value stepAdjust would mean that the value of CCA would breach the maximum sensitivity maxRST achievable by the device.

If CCA is not more than an adjustment step stepAdjust away from the limit maxRST then, in step S1-26, CCA is assigned the value maxRST. If CCA is more than an adjustment step stepAdjust away from the limit maxRST then, in step S1-28, the value CCA is changed by value stepAdjust towards the negative direction on the number line. The reader will note that, as explained above, as CCA is expressed as a negative value, this adjustment of the CCA value towards the maximum sensitivity maxRST serves to increase sensitivity.

If, in step S1-18, the collision count was less than half of N, or if, in step S1-20, the cause of the collisions was that one or more neighbouring APs were on the same channel as the AP of the subject device, then the method moves in step S1-30 to decrease sensitivity.

To do this, a determination is made in step S1-32 as to whether the sensitivity can be decreased from the level currently defined by CCA. That is, a calculation is made as to whether the sensitivity, expressed by the value of CCA, can be reduced by the value expressed by stepAdjust, without becoming lower than a smoothed average RSSI measure for signal strength of frames received from the AP associated with the device, i.e. the ACK frames received from the AP. If it cannot, then CCA is maintained at its current value in step S1-34. If CCA can be reduced by the value stepAdjust, then it is moved along the number line to the positive, so decreasing sensitivity by a value stepAdjust in step S1-36.

After any of steps S1-26, S1-28, S1-34 or S1-36, the counters Count, collisionCount and successfulTx are reverted to zero values, and the method then returns to step S1-4 to continue for further sets of N transmissions.

As can be seen, the method provides for increase, decrease, or maintenance of the CCA sensitivity of the device dependent on the results of N preceding transmissions. The method of this embodiment does not react merely to the incidence of a lost ACK but rather factors the potential cause of loss in the update decision. Further, the method considers manners in which sensitivity should be adapted. Yet further, devices performing the method are fully in control of their own CCA sensitivity, and are not reliant either on receipt of control information from other devices or associated APs, or on signalling control messages to other devices or associated APs. Thus, a device operating this described method is not dependent on the function of a neighbouring device.

As described above, the threshold for the number of collision related losses which trigger sensitivity reduction is 50%. However, the reader will appreciate that this threshold can be adjusted to meet the conditions of an implementation, and could for instance be 30%.

The rationale behind a decision to reduce carrier sensing range, in the particular circumstances whereby the number of collisions is too high and there are neighbouring APs operating on the same channel, is that there is a high likelihood that these collisions could be due to overlapping transmissions occurring in the neighbourhood. Therefore, reducing the carrier sensing range might improve performance.

On the other hand, if the number of collisions is above the pre-defined threshold (described above) and neighbouring APs are not operating on the same channel, this suggests that transmissions are being affected by overlapping transmissions occurring within the same BSS. This calls for a need to improve the carrier sensing range and therefore a decision is taken to increase the carrier sensing range.

Finally, if the number of collisions is below the predefined threshold (described above), a decision is taken to reduce the sensitivity in order to test whether performance could be further improved. Any decrease (increase) in sensitivity is carried out by adding (subtracting) stepAdjust to the existing CCA threshold.

As an example, the described method has the value of stepAdjust being 10 dBm. Whilst this is merely to illustrate the concept, the value of stepAdjust can be varied to make the adaptation process fine/coarse grained. In terms of the actual increase/decrease in sensitivity decision, the following should be noted:

The CCA threshold is decreased by stepAdjust only if the signal level received by the wireless device from its serving AP is less than the value that would result after the decrease. Otherwise, the existing threshold is retained. This is to ensure that the wireless device continues to be within range of the serving AP.

Similarly, the CCA threshold is increased by a "step" only if the value resulting from the increase does not fall below the maximum sensitivity supported by the wireless device. Otherwise, the CCA threshold is set to the maximum sensitivity supported by the interface card of the wireless device.

Even though the described embodiment compares the number of collisions, it will be appreciated that any other metric could be used instead.

Figure 4:
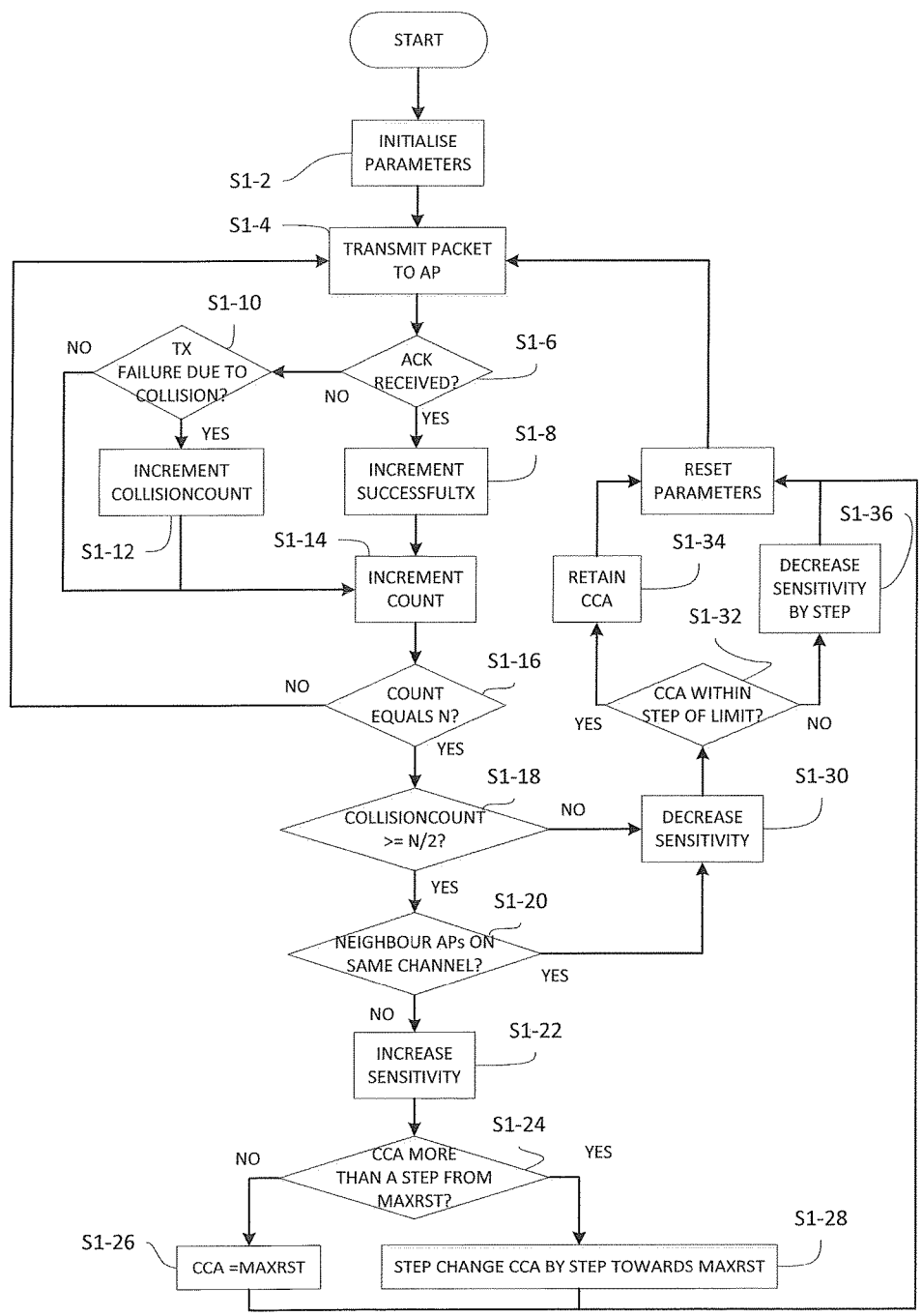
FIG. 4 is a schematic drawing of a method performed by the device of FIG. 3.

Also, even though a hard threshold based approach is shown in the flowchart of FIG. 4 (collisions>=N/2), a soft threshold based approach could also be employed. For example, a comparison could be made between a current value of a performance metric and a value of the same performance metric on a preceding occasion of measurement. A possible performance metric may be determined as a ratio of a measured value to a predetermined statistic.

As an example, a station in accordance with such an embodiment could measure the loss rate over a window of N transmission attempts. It could then compare this loss rate against the loss rate over the preceding window of N transmission attempts.

Similarly, a station could maintain a moving average, or any other reasonable statistic, of a metric such as the loss rate or retransmission rate, and then could compare the current statistic with the statistic from the previous window. This could help to identify a trend (performance monitoring indicative of improvement/deterioration) and therefore guide the CCA adaptation (increase/decrease) accordingly.

This disclosure describes a method by which each STA can independently update its sensitivity so as to counter link suppression effects. A key benefit of the embodiment, particularly as expressed in FIG. 4 is that it can be implemented by way of software update to existing equipment. It does not require any new measurements. Moreover, STAs that implement the described embodiment can co-exist with legacy devices (such as devices 100 as illustrated in FIG. 1) that do not implement the embodiment.

The process as described above is an example which employs a hub and spoke model of networking, with devices all associating with an access point, AP, and communications from a device being to its associated AP. However, the reader will appreciate that the disclosure need not be limited to such network configurations, and a peer-to-peer approach may equally be appropriate.

The process as described above relies, to determine network performance, on the receipt (or not) of an ACK message in response to a message emitted by a transmitting device. However, the disclosure should not be read as being limited to specific employment of an ACK message. Certain protocols do not send ACK messages. For example, certain protocols are NAK-based, in that they send a negative acknowledgement in cases where there is a problem, such as a missing packet. The reader will appreciate that the disclosed method can be modified to take account of NAK messages instead of ACK messages.

Further protocols encompass ACK messages and NAK messages. This may provide further information on the basis of which the failure of a message can be classified as being collision based or non-collision based.

It is also conceivable that a protocol may provide for a receiver sending a block ACK, which would be an acknowledgement of a plurality of packets, rather than sending an ACK per packet received. The above embodiments could easily be modified to take account of information borne in a block ACK, rather than in packet specific ACKs.

The embodiments have been described in schematic terms, with regard to the possibility of reconfiguring existing equipment to perform the described method by the provision of replacement and/or additional software components. For instance, an embodiment may be implemented by installing a plug-in or update to existing configuring software stored on a device. Alternatively, an embodiment may be implemented by complete replacement of the software on the device.

While the embodiments described herein focus on the potential advantage of backwards compatibility and/or ease of implementation by update or plug-in, nothing is suggested by this and the disclosure does not exclude the possibility of defining an embodiment in terms of original equipment, or the possibility that a device configured herein may not be compatible with past considered devices.

Whilst certain embodiments have been described, these embodiments have been presented by way of example only, and are not intended to limit the scope of the inventions. Indeed, the novel wireless stations, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A wireless communication apparatus operable to transmit packet via a wireless communications channel, the wireless communication apparatus comprising:
processor circuitry configured to:
determine if the channel is clear for use using a clear channel assessment, CCA, parameter which governs sensitivity of sensing a clear channel; and
control the CCA parameter based on a transmission performance of the wireless communication apparatus by monitoring performance of the wireless communication apparatus in terms of successful transmission by the wireless communication apparatus to intended destinations,
wherein:
the processor circuitry is configured to determine transmission performance on the basis of a rate of failure of transmissions to reach their intended destinations,
the processor circuitry is configured to determine if a transmission has failed to reach its intended destination and thence to determine if the failure of that transmission to reach its intended destination is likely to be the result of a collision with another transmission in the channel, and
the processor circuitry is configured to classify a failure in accordance with its likelihood of being due to a collision with another transmission in the channel, the classifier being operable with reference to channel information regarding past conditions of the channel.

2. The wireless communication apparatus in accordance with claim 1 wherein the processor circuitry is configured to check, for a packet based communication made by the wireless communication apparatus, whether a return message is received from the intended recipient of that packet based communication.

3. The wireless communication apparatus in accordance with claim 1 wherein the processor circuitry is configured to store information concerning a predetermined number of the most immediately precedent transmissions by the wireless-communication apparatus.

4. The wireless communication apparatus in accordance with claim 1 wherein the processor circuitry is configured to signal unacceptable performance of the wireless communication apparatus on the basis of a number of unsuccessful transmissions by the wireless communication apparatus to control the CCA parameter.

5. The wireless communication apparatus in accordance with claim 4 wherein the processor circuitry is configured to determine, for a predetermined number of prior transmissions by the wireless communication apparatus, a count of transmissions which potentially encountered collision during transmission.

6. The wireless communication apparatus in accordance with claim 5 wherein the processor circuitry is configured to signal unacceptable performance if the count of transmissions which potentially encountered collision exceeds a threshold within the predetermined number of transmissions by the wireless communication apparatus.

7. The wireless communication apparatus in accordance with claim 1 wherein the processor circuitry is configured to signal unacceptable performance of the wireless communication apparatus on the basis of a monitoring of a statistical performance metric during operation of the wireless communication apparatus.

8. The wireless communication apparatus in accordance with claim 7 wherein the statistical performance metric comprises at least one of a measure of packet loss over prior transmissions, a measure of retransmissions of packets over prior transmissions, or variation of a performance metric over prior transmissions.

9. A wireless communication apparatus operable to transmit packet based communication on a wireless communications channel, the wireless communication apparatus comprising:
 processor circuitry configured to:
  determine if the channel is clear for use using a clear channel assessment, CCA, parameter which governs sensitivity of sensing a clear channel; and
  control the CCA parameter based on a transmission performance of the wireless communication apparatus by monitoring performance of the wireless communication apparatus in terms of successful transmission by the wireless communication apparatus to intended destinations,
 wherein:
  the processor circuitry is configured to signal unacceptable performance of the wireless communication apparatus on the basis of a monitoring of a statistical performance metric during operation of the wireless communication apparatus,
  the statistical performance metric comprises at least one of a measure of packet loss over prior transmissions, a measure of retransmissions of packets over prior transmissions, or variation of a performance metric over prior transmissions, and
  the statistical performance metric comprises a variation of a performance metric over prior transmissions, the performance metric being a ratio of an operational value to a performance statistic.

10. A wireless communication apparatus operable to transmit packet based communication on a wireless communications channel, the wireless communication apparatus comprising:
 processor circuitry configured to:
  determine if the channel is clear for use using a clear channel assessment, CCA, parameter which governs sensitivity of sensing a clear channel; and
  control the CCA parameter based on a transmission performance of the wireless communication apparatus by monitoring performance of the wireless communication apparatus in terms of successful transmission by the wireless communication apparatus to intended destinations,
 wherein:
  the processor circuitry is configured to determine transmission performance on the basis of a rate of failure of transmissions to reach their intended destinations,
  the processor circuitry is configured to determine if a transmission has failed to reach its intended destination and thence to determine if the failure of that transmission to reach its intended destination is likely to be the result of a collision with another transmission in the channel, and
  the processor circuitry is configured to adjust the CCA parameter so as to raise the sensitivity of sensing the clear channel in controlling the CCA parameter, in the event that the performance of the wireless communication apparatus indicates that the number of transmissions potentially failing due to collisions is higher than a threshold.

11. A wireless communication apparatus operable to emit packet based communication on a wireless communications channel, the wireless communication apparatus comprising:
 processor circuitry configured to:
  determine if the channel is clear for use using a clear channel assessment, CCA, parameter which governs sensitivity of sensing a clear channel; and
  control the CCA parameter based on a transmission performance of the wireless communication apparatus by monitoring performance of the wireless communication apparatus in terms of successful transmission by the wireless communication apparatus to intended destinations,
 wherein:
  the processor circuitry is configured to determine transmission performance on the basis of a rate of failure of transmissions to reach their intended destinations,
  the processor circuitry is configured to determine if a transmission has failed to reach its intended destination and thence to determine if the failure of that transmission to reach its intended destination is likely to be the result of a collision with another transmission in the channel, and
  the processor circuitry is configured to adjust the CCA parameter so as to lower the sensitivity of sensing the clear channel in controlling the CCA parameter, in the event that the performance of the wireless communication apparatus indicates that the number of transmissions potentially failing due to collisions is higher than a threshold and that a neighbour transmitter of transmissions is operating on the same channel as the wireless communication apparatus.

12. A wireless communication apparatus operable to emit packet based communication on a wireless communications channel, the wireless communication apparatus comprising:
 processor circuitry configured to:
  determine if the channel is clear for use using a clear channel assessment, CCA, parameter which governs sensitivity of sensing a clear channel; and
  control the CCA parameter based on a transmission performance of the wireless communication apparatus by monitoring performance of the wireless communication apparatus in terms of successful transmission by the wireless communication apparatus to intended destinations,
 wherein:
  the processor circuitry is configured to determine transmission performance on the basis of a rate of failure of transmissions to reach their intended destinations,
  the processor circuitry is configured to determine if a transmission has failed to reach its intended destination and thence to determine if the failure of that transmission to reach its intended destination is likely to be the result of a collision with another transmission in the channel, and
  the processor circuitry is configured to adjust the CCA parameter so as to lower the sensitivity of sensing the clear channel in controlling the CCA parameter, in the event that the performance of the wireless communication apparatus indicates that the number of transmissions potentially failing due to collisions is lower than a threshold.

13. A wireless communication apparatus operable to emit packet based communication on a wireless communications channel, the wireless communication apparatus comprising:
  processor circuitry configured to:
    determine if the channel is clear for use using a clear channel assessment, CCA, parameter which governs sensitivity of sensing a clear channel; and
    control the CCA parameter based on a transmission performance of the apparatus by monitoring performance of the apparatus in terms of successful transmission by the apparatus to intended destinations,
  wherein:
    the processor circuitry is configured to determine transmission performance on the basis of a rate of failure of transmissions to reach their intended destinations,
    the processor circuitry is configured to determine if a transmission has failed to reach its intended destination and thence to determine if the failure of that transmission to reach its intended destination is likely to be the result of a collision with another transmission in the channel, and
    the processor circuitry is configured to adjust the sensitivity of sensing the clear channel by controlling the CCA parameter based on at least one of whether the number of transmissions potentially failing due to collisions is higher than a threshold, or whether a neighbour transmitter of transmissions is operating on the same channel as the wireless communication apparatus.

* * * * *